United States Patent
Gore et al.

(10) Patent No.: US 8,861,429 B2
(45) Date of Patent: Oct. 14, 2014

(54) SELECTIVE CARRIER AMPLIFICATION IN A WIRELESS REPEATER

(75) Inventors: Dhananjay Ashok Gore, San Diego, CA (US); James Arthur Proctor, Jr., Melbourne Beach, FL (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 13/155,276

(22) Filed: Jun. 7, 2011

(65) Prior Publication Data

US 2012/0314647 A1    Dec. 13, 2012

(51) Int. Cl.
*H04W 88/04* (2009.01)

(52) U.S. Cl.
USPC .......................................... 370/318; 370/326

(58) Field of Classification Search
CPC .............................. H04B 7/2606; H04W 88/04
USPC .................................................. 370/315–326
See application file for complete search history.

(56) References Cited

U.S. PATENT DOCUMENTS

| | | | |
|---|---|---|---|
| 5,809,398 A | 9/1998 | Moberg et al. | |
| 6,047,162 A * | 4/2000 | Lazaris-Brunner et al. | 455/12.1 |
| 7,627,287 B2 | 12/2009 | Moss | |
| 2006/0098592 A1 | 5/2006 | Proctor, Jr. et al. | |
| 2008/0159187 A1* | 7/2008 | Van Buren | 370/297 |
| 2010/0009625 A1* | 1/2010 | Chami et al. | 455/11.1 |
| 2010/0034107 A1* | 2/2010 | Chin et al. | 370/252 |
| 2010/0062717 A1* | 3/2010 | Brisebois et al. | 455/63.1 |
| 2010/0284280 A1* | 11/2010 | Gore et al. | 370/241 |
| 2010/0291865 A1* | 11/2010 | Gore et al. | 455/7 |
| 2010/0311480 A1* | 12/2010 | Raines et al. | 455/575.7 |

FOREIGN PATENT DOCUMENTS

GB          2428934 A          2/2007

OTHER PUBLICATIONS

International Search Report and Written Opinion—PCT/US2011/043436—ISA/EPO—Feb. 21, 2012.

* cited by examiner

*Primary Examiner* — Ronald Abelson
(74) *Attorney, Agent, or Firm* — Thien T. Nguyen

(57) ABSTRACT

A method in a wireless repeater selects one or more carriers out of all carriers for amplification and transmission. The non-selected carriers may be blocked to mitigate delay spread, uplink noise contribution or other effects on the repeater environment due to multiple repeaters. The carriers may be selected based on signal characteristics, signal usage, and/or other parameters.

23 Claims, 4 Drawing Sheets

SELECTIVE CARRIER AMPLIFICATION IN A WIRELESS REPEATER

BACKGROUND

1. Field

This disclosure generally relates to repeaters in wireless communication systems.

2. Background

Wireless communication systems and techniques have become an important part of the way we communicate. However, providing coverage can be a significant challenge to wireless service providers. One way to extend coverage is to deploy repeaters.

In general, a repeater is a device that receives a signal, amplifies the signal, and transmits the amplified signal. FIG. 1 shows a basic diagram of a repeater 110, in the context of a cellular telephone system. Repeater 110 includes a donor antenna 115 as an example network interface to network infrastructure such as a base station 125. Repeater 110 also includes a server antenna 120 (also referred to as a "coverage antenna") as a mobile interface to mobile device 130. In operation, donor antenna 115 is in communication with base station 125, while server antenna 120 is in communication with mobile devices 130.

In repeater 110, signals from base station 125 are amplified using forward link circuitry 135, while signals from mobile device 130 are amplified using reverse link circuitry 140. Many configurations may be used for forward link circuitry 135 and reverse link circuitry 140.

There are many types of repeaters. In some repeaters, both the network and mobile interfaces are wireless; while in others, a wired network interface is used. Some repeaters receive signals with a first carrier frequency and transmit amplified signals with a second different carrier frequency, while others receive and transmit signals using the same carrier frequency. For "same frequency" repeaters, one particular challenge is managing the feedback that occurs since some of the transmitted signal can leak back to the receive circuitry and be amplified and transmitted again.

Existing repeaters manage feedback using a number of techniques; for example, the repeater is configured to provide physical isolation between the two antennae, filters are used, or other techniques may be employed.

SUMMARY

Systems, apparatuses, and methods disclosed herein allow for enhanced repeater capability. In one embodiment, a method in a wireless repeater includes receiving an input signal of an uplink or downlink transmission at a first antenna and transmitting an output signal of the respective uplink or downlink transmission on a second antenna of the wireless repeater where at least the input signal is associated with multiple carriers; selecting at least one carrier for downlink transmission from the multiple carriers; selecting at least one carrier for uplink transmission corresponding to the selected carrier for downlink transmission; and amplifying and transmitting only the selected carrier for at least the uplink transmission.

In another embodiment, a wireless repeater having a first antenna and a second antenna to receive an input signal and transmit an output signal where at least the input signal is associated with multiple carriers includes a receive circuit configured to receive the input signal of an downlink or uplink transmission and generate a baseband input signal, a transmit circuit configured to generate the output signal of the respective uplink or downlink transmission from the baseband output signal, and a processor device configured to select at least one carrier for downlink transmission from the multiple carriers and at least one carrier for uplink transmission corresponding to the selected carrier for downlink transmission. In operation, after at least one uplink-downlink carrier is selected, the repeater is operative to amplify and transmit only the selected carrier for at least the uplink transmission.

DETAILED DESCRIPTION

Figure 1:
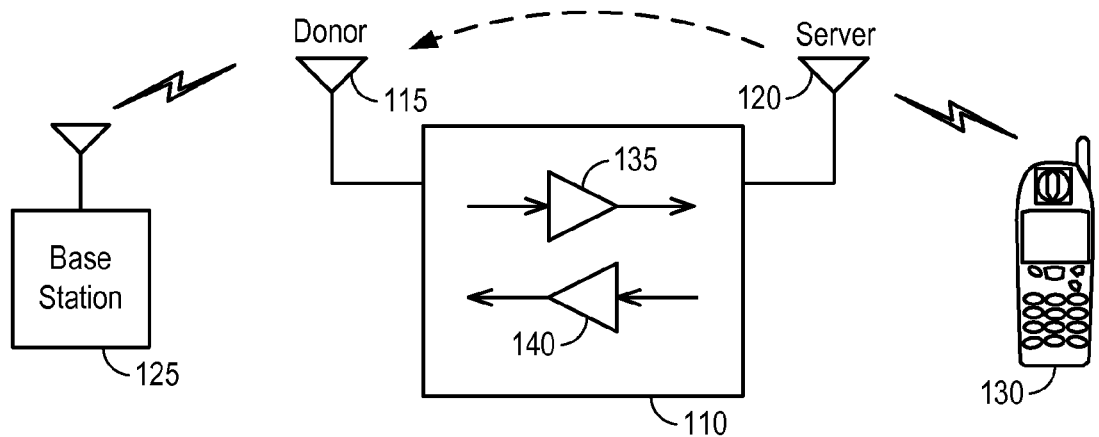
FIG. 1 is a simplified diagram of a repeater according to the prior art.

The nature, objectives, and advantages of the disclosed method and apparatus will become more apparent to those skilled in the art after considering the following detailed description in connection with the accompanying drawings.

Prior art repeaters such as those described above may provide significant advantages for cellular telephone or similar networks. However, existing repeater configurations may not be suitable for some applications. For example, existing repeater configurations may not be suitable for indoor coverage applications (e.g., repeating signals for a residence or business environment) which may require substantially more isolation between the repeater's antennas. Moreover, in some traditional repeater implementations, the target is to achieve as high a gain as reasonable while maintaining a stable feedback loop (loop gain less than unity). However, increasing the repeater gain renders stable operation more difficult due to the increased signal leaking back into the donor antenna. In general, loop stability and minimal noise injection demands require that the signal leaking back into the donor antenna from the coverage antenna be much lower than the remote signal (the signal to be repeated). Thus, to ensure stability, a repeater's gain is traditionally limited to less than the isolation from the server antenna to the donor antenna, by some margin. When the gain of a traditional repeater exceeds its isolation, a positive feedback condition occurs resulting in oscillation.

In some traditional repeaters, interference cancellation or echo cancellation is used to improve the isolation between the repeaters' donor and coverage antennas. Digital baseband interference cancellation may be employed in repeaters to realize increased isolation in the repeater, enabling the ability to achieve higher overall isolation and thereby higher gain. Digital baseband interference cancellation or echo cancellation is implemented by using baseband samples of the transmit signal, in conjunction with baseband samples of the receive signals, to first estimate the feedback channel (or the "leakage channel") between the donor antenna and the server antenna. The feedback channel estimate along with the baseband samples of the transmit signal are then used to generate an estimated feedback signal, also referred to as the "estimated leakage signal." The estimated leakage signal is then subtracted from the receive signal to actively cancel the interference, thereby allowing higher gain to be used while preventing oscillation. Effective echo cancellation requires very accurate channel estimation. In general, the more accurate the channel estimate, the higher the cancellation and hence the higher the effective isolation. Herein, "interference cancellation" or "echo cancellation" refers to techniques that reduce or eliminate the amount of leakage signal between repeater antennas; that is, "interference cancellation" refers to cancellation of an estimated leakage signal, which provides for partial or complete cancellation of the actual leakage signal.

Figure 2:
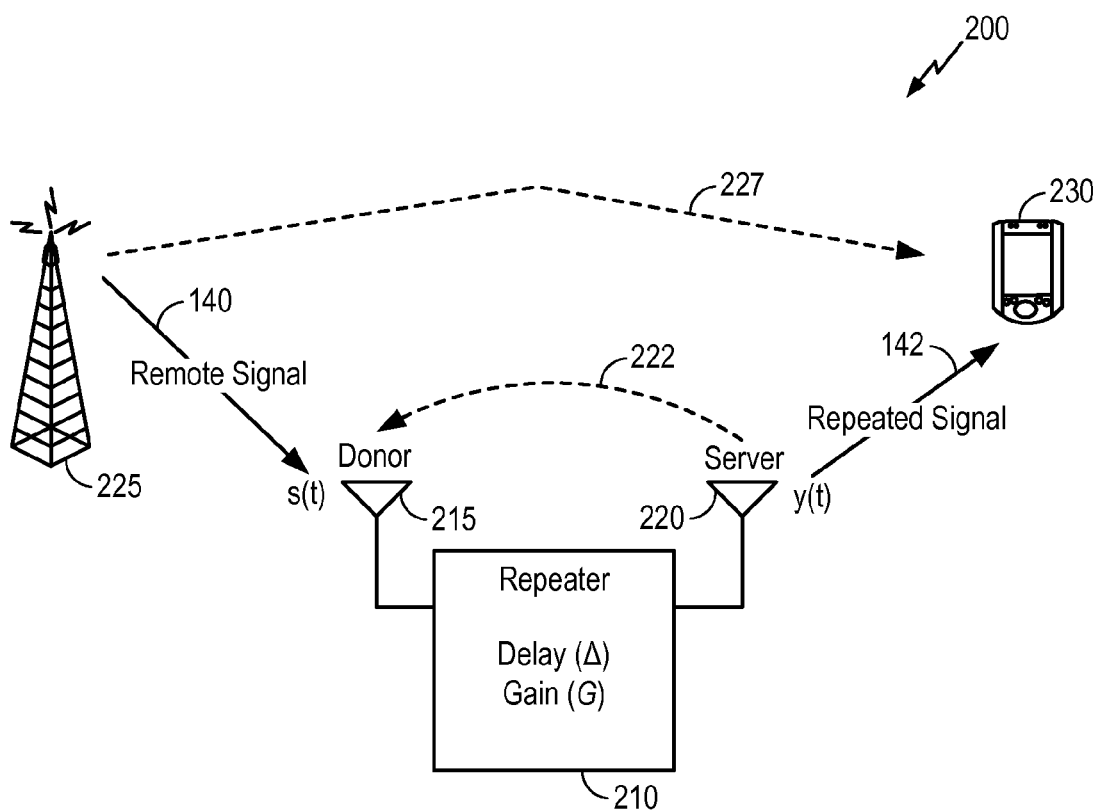
FIG. 2 shows a diagram of a repeater environment according to some embodiments of the current disclosure.

FIG. 2 shows a diagram of an operating environment 200 for a repeater 210 according to embodiments of the current disclosure. The example of FIG. 2 illustrates forward link transmissions; i.e., a remote signal 140 from a base station 225 is intended for a mobile device 230. A repeater, such as repeater 210, may be used in environment 200 if an unrepeated signal along the path 227 between base station 225 and mobile device 230 would not provide sufficient signal for effective voice and/or data communications received at mobile device 230. Repeater 210 with a gain G and a delay Δ is configured to repeat a signal received from base station 225 on a donor antenna 215 to mobile device 230 using a server antenna 220. Repeater 210 includes forward link circuitry for amplifying and transmitting signals received from the base station 225 to mobile device 230 through donor antenna 215 and server antenna 220. Repeater 210 may also include reverse link circuitry for amplifying and transmitting signals from mobile device 230 back to base station 225. At repeater 210, the remote signal s(t) is received as an input signal and the remote signal s(t) is repeated as a repeated or amplified signal y(t) where $y(t)=\sqrt{G}s(t-\Delta)$. Ideally, the gain G would be large, the inherent delay Δ of the repeater would be small, the input SNR would be maintained at the output of repeater 210 (this can be of particular importance for data traffic support), and only desired carriers would be amplified.

In practice, the gain of repeater 210 is limited by the isolation between donor antenna 215 and server antenna 220. If the gain is too large, the repeater can become unstable due to signal leakage. Signal leakage refers to the phenomenon where a portion of the signal that is transmitted from one antenna (in FIG. 2, server antenna 220) is received by the other antenna (in FIG. 2, donor antenna 215), as shown by the feedback path 222 in FIG. 2. In other words, signal leakage is a result of the transmitted signal not being totally blocked by antenna isolation between the receiving and transmitting antennas. Without interference cancellation or other techniques, the repeater would amplify this feedback signal, also referred to as the leakage signal, as part of its normal operation, and the amplified feedback signal would again be transmitted by server antenna 220. The repeated transmission of the amplified feedback signal due to signal leakage and high repeater gain can lead to repeater instability. Additionally, signal processing in repeater 210 has an inherent non-negligible delay Δ. The output SINR of the repeater is dependent on RF non-linearities and other signal processing. Thus, the aforementioned ideal repeater operational characteristics are often not attained. Finally, in practice, the desired carriers can vary depending on the operating environment or market in which the repeater is deployed. It is not always possible to provide a repeater that amplifies only the desired carriers.

The communication system in which the repeater of the present invention can be deployed includes various wireless communication networks based on infrared, radio, and/or microwave technology. Such networks can include, for example, a wireless wide area network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The systems and techniques described herein may also be used for any combination of WWAN, WLAN and/or WPAN.

Repeater Amplification

A typical repeater repeats all carriers. If there are N carriers in the environment, the conventional repeater will support amplification for N carriers in the uplink and N carriers in the downlink. For instance, the repeater may be used to augment WAN coverage in an indoor environment. Repeaters used in an indoor environment can result in a host of issues. First, repeaters continuously amplify all of the carriers. This increases multipath in the environment and can increase the noise floor on the uplink. Second, in a multiple repeater environment, repeater transmission can cause potential instability due to repeater-repeater interaction in the presence of other repeaters.

However, in a typical indoor repeater usage environment, the indoor repeater supports a small number, usually one or two simultaneous calls or communication sessions. This implies that although the repeater may be amplifying N carriers continuously, only one or two of the carriers are actually in use a fraction of the time. Thus, when there is no activity, the repeater is just amplifying noise and the noise amplification creates more interference.

Selective Carrier Amplification

According to some embodiments of the present invention, a repeater with the capability to support N carriers implements selective carrier amplification to amplify only a subset of the N carrier pairs in the uplink and the downlink transmissions. In one embodiment, the repeater amplifies only one pair of uplink and downlink carriers. In other embodiments, the repeater amplifies M out of N carriers for each of the uplink or downlink transmissions, where M is one or greater but is less than N. Criteria for selecting the M carriers can include the signal quality, carrier usage and others.

In the present description, a carrier (or a carrier wave) refers to the waveform that is modulated with a transmitted signal for transmission over a communication channel within a given radio frequency band. A radio band, such as the industrial, scientific and medical (ISM) radio bands, is partitioned into different carrier frequencies, each with a given frequency bandwidth, to allow multiple carriers to share a common transmission band. A carrier or carrier wave is transmitted within a given radio band, over a given frequency bandwidth, and centered at a center frequency being the carrier frequency.

Figure 3:
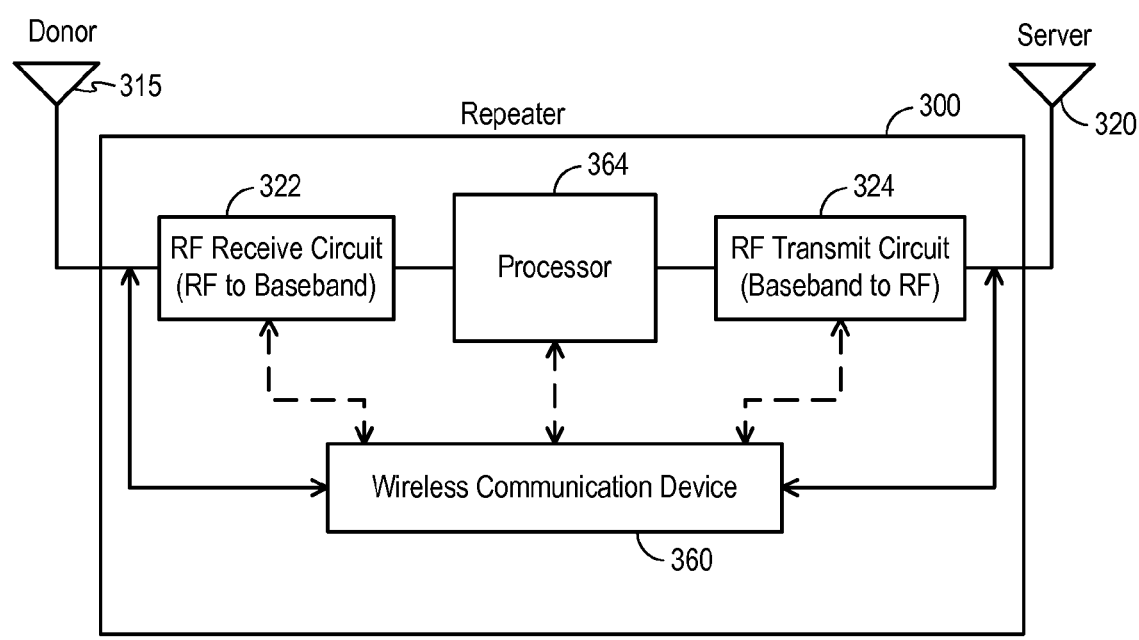
FIG. 3 is a block diagram of a wireless repeater implementing selective carrier amplification method according to one embodiment of the present invention.

As described above, in a typical indoor repeater usage environment, the indoor repeater supports very few simultaneous calls or communications sessions, typically only one or two. Thus, although the repeater may be amplifying N carriers continuously, only one or two of the carriers are actually in use a fraction of the time. Therefore, by amplifying only selected carriers in accordance with the selective carrier amplification method of the present invention, damages to the repeater environment due to the use of the repeater can be substantially mitigated while enjoying the advantages of the repeater FIG. 3 is a block diagram of a wireless repeater implementing selective carrier amplification method according to one embodiment of the present invention. Referring to FIG. 3, a repeater 300 includes a donor antenna 315 and a server antenna 320. Repeater 300 also includes an RF receive circuit 322 for processing and converting the incoming receive signals received on antenna 315 from RF to baseband. Repeater 300 further includes an RF transmit circuit 324 for processing and converting the outgoing transmit signals from baseband to RF for transmission on antenna 320. In the present illustration, repeater 300 is shown with only the forward link circuitry. The reverse link circuitry for transmission in the reverse direction (receiving on server antenna 320 and transmitting on donor antenna 315) is omitted for simplicity. It is understood that repeater 300 may contain both forward link and reverse link circuitry to enable transmissions in both the forward and reverse link directions. Duplexers may be connected to antennas 315 and 320 to facility bi-directional (duplex) communication.

As used herein, forward and reverse link transmissions may also be referred to as uplink and downlink transmissions. Repeater 300 may be disposed to receive and amplify downlink transmissions from a base station to a mobile device. Repeater 300 may also be disposed to receive and amplify uplink transmissions from a mobile device to a base station. Thus, in the forward link direction, downlink transmissions from the base station may be received by the donor antenna 315 and amplified and transmitted to the mobile device on server antenna 320. On the other hand, in the reverse link direction, uplink transmissions from the mobile device may be received by the server antenna and amplified and transmitted to the base station on donor antenna 315. In the present description, a "receiving antenna" refers to an antenna of the repeater currently receive incoming signals and may be either the donor antenna 315 or the server antenna 320; and a "transmitting antenna" refers to an antenna of the repeater currently transmitting outgoing signals and may be either the donor antenna 315 or the server antenna 320.

In the present embodiment, repeater 300 includes a processor 364 for processing the baseband signals from RF receive circuit 322 and generating the transmit signals for RF transmit circuit 324. In general, the processor device 364 contains the digital logic necessary to implement the receive and transmit functions of the repeater. For example, it may include circuitry for performing filtering, baseband echo cancellation and amplification of the signal received from RF receive circuit 322. In some embodiments, repeater 300 also includes a wireless communication device 360. The wireless communication device 360 may be implemented as a modem and may be in communication with the processor device 364, the RF receive circuit 322, the RF transmit circuit 324, the donor antenna 315 and/or the server antenna 320. The wireless communication device 360 may include circuitry to support wireless communication over a wireless network, including circuitry to transmit, receive and process wireless signals but need not include speaker circuitry, microphone circuitry, or the like. The wireless communication device may further include measurement and processing circuitry to monitor the performance or operating conditions of the communication channel. For example, the wireless communication device may be used to determine signal parameters indicative of signal quality of an input signal in order to enable selection of one or more carriers. The signal parameters may be indicative of signal strength, signal to interference noise ratio, and/or other signal parameters. In some embodiments, the wireless communication device may include one or more chipsets such as a Qualcomm Mobile Station Modem™ (MSM) chipset (although many types of chipsets may be used). In one embodiment, the wireless communication device 360 is in communication with the donor antennas 315 and the server antenna 320 only. In addition to determining signal parameters, wireless communication device 360 may be used to send and receive information from one or more network resources. For example, wireless communication device 360 may receive control information from a network resource to select one or more carriers, may receive information enabling the repeater to select one or more carriers, may receive control information to perform other actions for selecting carriers (such as measuring signal parameters), etc.

Figure 4:
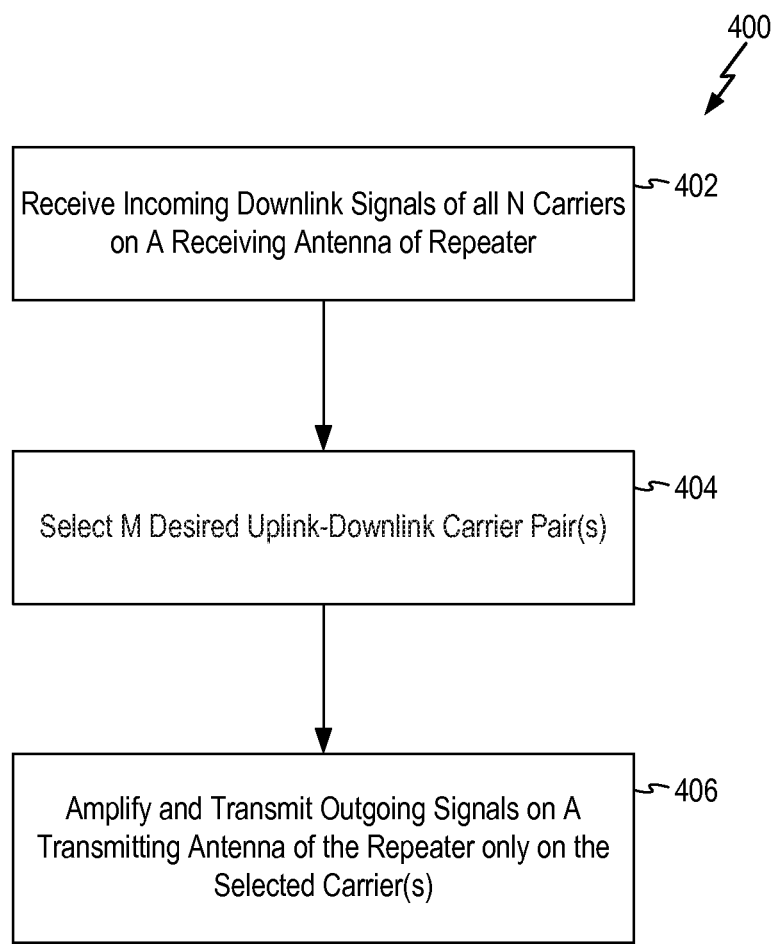
FIG. 4 is a flow chart illustrating the selective carrier amplification method according to one embodiment of the present invention.

FIG. 4 is a flow chart illustrating the selective carrier amplification method according to one embodiment of the present invention. Referring to FIG. 4, a repeater, such as repeater 300, implementing the selective carrier amplification method 400 receives incoming downlink receive signals of all N carriers on a receiving antenna of the repeater (step 402). For downlink transmissions, the receiving antenna is the donor antenna 315 of repeater 300. Then, repeater 300 selects M desired downlink carrier out of the N carriers, where M is one or greater and is less than N (step 404). The selection can be based on one of several criteria, as will be described in more detail below. Repeater 300 also operates to select uplink carriers corresponding to the selected downlink carrier(s). In this manner, M desired uplink and downlink carrier pair(s) are selected. In embodiments of the present invention, the selection of downlink and uplink carriers is performed by the repeater based on signal measurements made by either the processor of the repeater or the wireless communication device of the repeater. In one embodiment, the processor of the repeater performs the carrier selection operations.

Repeater 300 then amplifies and transmits outgoing transmit signals on a transmitting antenna only on the selected carrier(s) (step 406). For downlink transmissions, the transmitting antenna is the server antenna 320 of repeater 300. In this manner, only a subset of the total N carriers is being amplified by repeater 300. Damages to the repeater environment, such as increased multipath or increase in the noise floor at the base station, are substantially mitigated by amplifying only the selected carriers.

According to embodiments of the present invention, the selective carrier amplification method of the present invention applies different criteria to select the desired uplink-downlink carrier pair(s).

In some embodiments, a selective carrier amplification method for a wireless repeater selects the desired uplink-downlink carrier pair(s) to be amplified based on the signal quality of the receive signals. In one embodiment, the downlink carrier with the best signal quality is selected. The uplink carrier corresponding to the selected downlink carrier is selected to form the selected uplink-downlink carrier pair. In some embodiments, a downlink carrier with the best signal quality is an downlink carrier that has the highest signal strength. In other embodiments, a downlink carrier with the best signal quality is a downlink carrier that has the highest signal-to-interference-noise ratio (SINR). In one embodiment, the wireless communication device of the repeater (such as wireless communication device 360 of repeater 300) searches for the carrier with the best signal quality in the downlink receive signals. The repeater then selects the carrier with the best signal quality for the downlink and the corresponding carrier for the uplink based on measurements from the wireless communication device. Further communication with the repeater is carried out using the selected uplink-downlink carrier pair. In embodiments of the present invention, the processor of the repeater (such as processor 364 of repeater 300) performs the carrier selection based on measurements of the signal quality from either the wireless communication device or from the processor itself.

In some embodiments, the selective carrier amplification method for a wireless repeater selects the desired uplink-downlink carrier pair(s) to be amplified in a manner that at least to some extent disregards the signal quality. For example, the carriers) can be selected in a random or a pseudo random manner. In one embodiment, a hash function is used to assign a carrier to the repeater. In some embodiments, the selective carrier amplification method for a wireless repeater selects the desired uplink-downlink carrier pair(s) in order to minimize or mitigate inter-repeater interference. For example, when two repeaters are deployed in close proximity to each other, such as in two apartments of an apartment complex, the closely spaced repeaters can cause oscillation. In accordance with the selective carrier amplification method of the present invention, two different carriers are assigned to the two repeaters so that the neighboring repeaters will transmit on different carriers, thereby mitigating inter-repeater interference. In one embodiment, the wireless operator assigns the carrier to the respective repeaters For instance, a wireless operator may use a hash function to assign a carrier to the repeater. The selective carrier amplification method selects the carrier assigned to the repeater as the desired uplink-downlink carrier pair for amplification. The repeater then amplifies only the selected carrier being the carrier assigned to the repeater and does not amplify other carriers. In some cases, different repeaters may be controlled differently. For example, a repeater in one apartment may be configured to use a particular carrier or set of carriers, while a repeater in another apartment may be configured to select carrier frequencies according to techniques such as those described herein. In such a configuration, the repeater configured to select carrier frequencies may determine that a proximate device is using a particular carrier or set of carriers and may use this information in its selection process. For example, the repeater may exclude the carrier frequency of its neighbor from the possible selections, or may initially select carrier(s), determine if there is interference, and if so select a different carrier. In some embodiments, the repeater may transmit information to the operator (where "the operator" refers to one or more network resources providing information and/or instructions to the repeater) to allow determination of appropriate frequencies/interference at the operator.

In some other embodiments, the selective carrier amplification method for a wireless repeater selects the desired uplink-downlink carrier pair to be amplified using a priority list supplied by the wireless operator. In some situations, the wireless operator has a priority list of carriers to use for the repeater. Accordingly, in one embodiment, the repeater, such as through the processor of the repeater, retrieves the priority list of carriers and selects the M desired uplink and downlink carriers based on the priority list supplied by the wireless operator. After the selection, only the M selected uplink/downlink carrier pairs will be amplified. As in the above, some measure of signal quality may be used in addition to a priority list.

Figure 5:
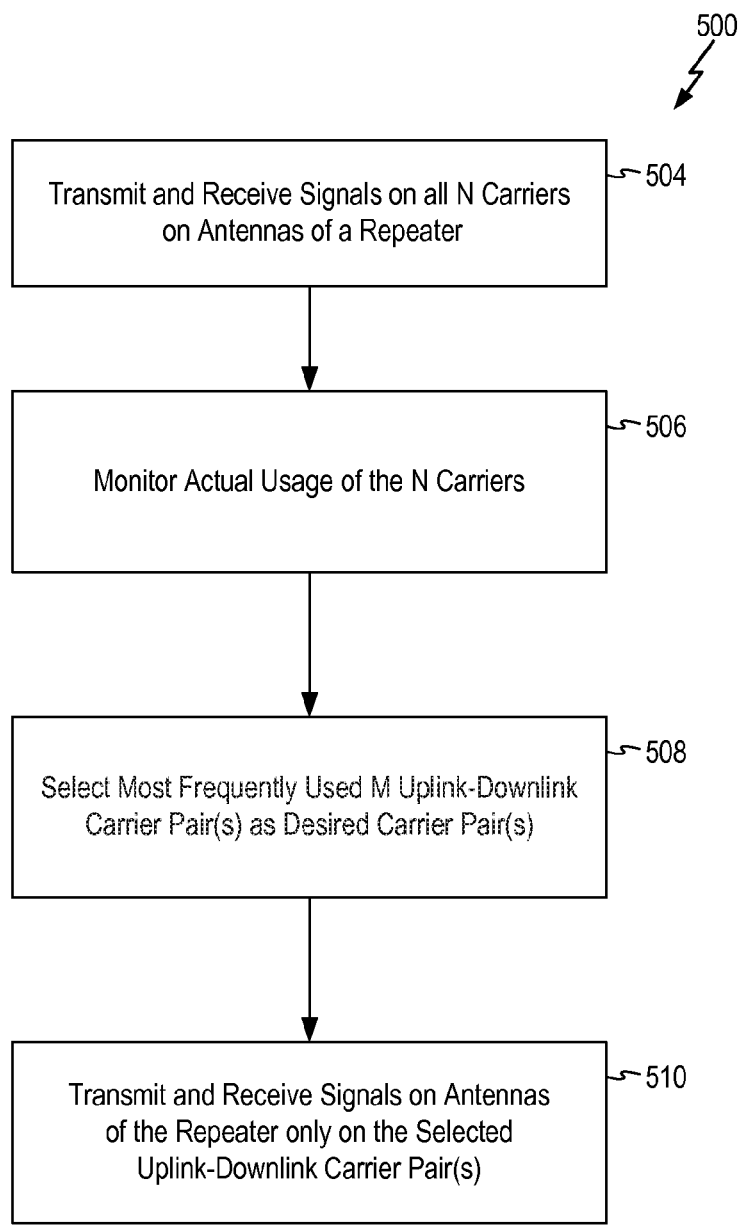
FIG. 5 is a flow chart illustrating the selective carrier amplification method according to an alternate embodiment of the present invention.

In some embodiments, the selective carrier amplification method applies an adaptive approach to select the desired carrier pair for amplification. FIG. 5 is a flow chart illustrating the selective carrier amplification method according to an alternate embodiment of the present invention. Referring to FIG. 5, a repeater, such as repeater 300, implementing the selective carrier amplification method 500 receives and repeats all N carriers in uplink and downlink transmissions (step 504). Over a period of time, the repeater monitors the calls or communication sessions coming in through the repeater and monitors the actual usage of the N carriers (step 506). More specifically, the repeater detects the most frequently used carrier(s). Repeater 300 then selects the M most frequently used uplink-downlink carrier pair(s) as the desired carrier pair(s) for amplification (step 508), where M is one or greater and is less than N. In one embodiment, repeater 300 selects one or more carriers on the downlink whose corresponding carriers on the uplink are the most frequently used carriers. Repeater 300 then amplifies and transmits only on the M selected uplink-downlink carrier(s) (step 510). In another embodiment, the repeater 300 continues to amplify and transmit all N carriers on the downlink but amplifies and transmits only the selected M carriers on the uplink.

In this manner, only a subset of the total N carriers is being amplified by repeater 300. More specifically, the selective carrier amplification method 500 selects the carrier based on actual usage of the carriers. The carrier selection process can be updated periodically by sweeping through all of the carriers to determine the most frequently used carrier(s). In this manner, the most frequently used carrier pair(s) for a given time period is always selected as the desired carrier pair(s).

In some embodiments, carrier selection may use more than one of the example techniques outlined above. For example, some measure of signal quality can be used in addition to random or pseudorandom selection, list selection, etc. In an example embodiment, the repeater may be configured to use a pseudorandom selection technique to select one or more carriers from among a plurality of signals with acceptable signal parameters (for example, a SNR ratio above a threshold, a signal strength above a threshold, etc.) Other combinations may be used.

In some embodiments, the selective carrier amplification method of the present invention implements carrier selection using the receive and transmit circuits in the repeater. In one embodiment, the repeater, such as repeater 300, implements blocking of the unselected carriers and selecting of the carrier(s) of choice by programming the filter coefficient for the receive and transmit filter in the RF receive circuit 322 and the RF transmit circuit 324 of the repeater.

The advantages of the selective carrier amplification method of the present invention include mitigating multi-repeater issues since the probability that the same carrier is being repeated on nearby repeaters is low. Also, by limiting the number of carriers being amplified, the damage to the repeater environment due to delay spread is reduced. Furthermore, the rise over thermal (RoT) damage on the uplink is also limited since the unselected carriers are effectively gated. Finally, in general the selective carrier amplification method presents no implication to the end user throughput since in most situations only one or two carriers would actually carry data out of N available carriers.

Those skilled in the art will understand that information and signals may be represented using any of a variety of different technologies and techniques. For example: data, information, signals, bits, symbols, chips, instructions, and commands may be referenced throughout the above description. These may be represented by voltages, currents, electromagnetic waves, magnetic fields or particles, optical fields or particles, or any combination thereof.

In one or more exemplary embodiments, the functions and processes described may be implemented in hardware, software, firmware, or any combination thereof. If implemented in software, the functions may be stored on or transmitted over as one or more instructions or code on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The term "control logic" used herein applies to software (in which functionality is implemented by instructions stored on a machine-readable medium to be executed using a processor), hardware (in which functionality is implemented using circuitry (such as logic gates), where the circuitry is configured to provide particular output for particular input, and firmware (in which functionality is implemented using re-programmable circuitry), and also applies to combinations of one or more of software, hardware, and firmware.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile station or a repeater, and executed by a processor, for example the microprocessor of modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. "Computer readable medium," "storage medium" and the like do not refer to transitory propagating signals.

Moreover, the previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the features shown herein but is to be accorded the widest scope consistent with the principles and novel features disclosed herein.

What is claimed is:

1. A method in a first wireless repeater, comprising:
receiving an input signal of an uplink or downlink transmission at a first antenna and transmitting an output signal of the respective uplink or downlink transmission on a second antenna of the first wireless repeater, the input signal being associated with a plurality of carriers;
selecting at least one carrier for downlink transmission from the plurality of carriers, wherein the selected at least one carrier is different than a carrier for a second repeater proximate to the first repeater, wherein a hash function that excludes selection of the carrier for the second repeater is used, at least in part, to select the at least one carrier for the first repeater;
selecting at least one carrier for uplink transmission corresponding to the selected carrier for downlink transmission and
amplifying and transmitting only the selected at least one carrier for at least the uplink transmission.

2. The method of claim 1, further comprising:
amplifying and transmitting only the selected at least one carrier for the downlink transmissions.

3. The method of claim 1, wherein the plurality of carriers comprises N carriers and selecting at least one carrier for downlink transmission from the plurality of carriers and selecting at least one corresponding carrier for uplink transmission comprises:
selecting M carriers for downlink transmission and M corresponding carriers for uplink transmission from the N carriers, M being one or greater, and less than N.

4. The method of claim 1, wherein selecting the at least one carrier for downlink transmission from the plurality of carriers comprises:
determining one or more signal parameters indicative of signal quality of the input signal; and
selecting the at least one carrier for downlink transmission based, at least in part, on the one or more signal parameters indicative of signal quality.

5. The method of claim 4, wherein the one or more signal parameters is indicative of signal strength and wherein selecting the at least one carrier for downlink transmission based on the one or more signal parameters indicative of signal quality comprises selecting a carrier for an downlink transmission associated with an input signal having a highest signal strength.

6. The method of claim 4, wherein the one or more signal parameters is indicative of signal-to-interference noise ratio and wherein selecting the at least one carrier for downlink transmission based on the one or more signal parameters indicative of signal quality comprises selecting a carrier for a downlink transmission associated with an input signal having a highest signal-to-interference noise ratio.

7. The method of claim 1, wherein selecting the at least one carrier for downlink transmission from the plurality of carriers comprises:
selecting the at least one carrier for downlink transmission in a pseudo-random manner.

8. The method of claim 1, wherein selecting at least one carrier for downlink transmission from the plurality of carriers comprises:
selecting at least one carrier for downlink transmission based, at least in part, on a priority list of carriers to use.

9. The method of claim 1, wherein selecting at least one carrier for downlink transmission from the plurality of carriers comprises:
accessing information indicative of a plurality of most frequently used carriers for uplink transmissions; and
selecting one or more carriers for downlink transmission corresponding to one or more of the plurality of most frequently used carriers for uplink transmission.

10. A first wireless repeater having a first antenna and a second antenna to receive an input signal and transmit an output signal, the input signal associated with a plurality of carriers, the repeater comprising:

a receive circuit configured to receive the input signal of an downlink or uplink transmission and generate a baseband input signal;

a transmit circuit configured to generate the output signal of the respective uplink or downlink transmission from a baseband output signal; and a processor device configured to:

select at least one carrier for downlink transmission from the plurality of carriers, wherein the selected carrier is different than a carrier for a second repeater proximate to the first repeater, wherein a hash function that excludes selection of the carrier for the second repeater is used, at least in part, to select the at least one carrier for the first repeater, and select at least one carrier for uplink transmission corresponding to the selected carrier for downlink transmission;

wherein after the at least one uplink and the at least one downlink carriers are selected, the repeater is operative to amplify and transmit only the at least one selected uplink carrier for at least the uplink transmissions.

11. The first wireless repeater of claim 10, wherein the repeater is further operative to amplify and transmit only the selected downlink carrier for downlink transmissions.

12. The first wireless repeater of claim 10, wherein the plurality of carriers comprises N carriers and the processor device is configured to select M carriers for uplink transmission and M corresponding carriers for downlink transmission from the N carriers, M being one or greater and much less than N.

13. The first wireless repeater of claim 10, wherein the processor device is configured to:

determine one or more signal parameters indicative of signal quality of the input signal; and select the at least one carrier for downlink transmission from the plurality of carriers by selecting a carrier for downlink transmission based, at least in part, on the one or more signal parameters indicative of signal quality.

14. The first wireless repeater of claim 13, wherein the one or more signal parameters are indicative of signal strength and wherein the processor device is configured to select the at least one carrier for downlink transmission by selecting a carrier for a downlink transmission associated with an input signal having a highest signal strength.

15. The first wireless repeater of claim 13, wherein the one or more signal parameters are indicative of signal-to-interference and wherein the processor device is configured to select the at least one carrier for downlink transmission by selecting a carrier for an downlink transmission associated with an input signal having a highest signal-to-interference noise ratio.

16. The first wireless repeater of claim 13, further comprising a wireless communication device configured to support wireless communication over a wireless network and to generate one or more signal parameters indicative of signal quality of the input signal, and wherein the processor device is configured to select the at least one carrier for downlink transmission using the one or more signal parameters indicative of signal quality of the input signal generated by the wireless communication device.

17. The first wireless repeater of claim 10, wherein the processor device is configured to select at least one carrier for downlink transmission from the plurality of carriers by selecting a carrier for downlink transmission in a pseudo-random manner.

18. The first wireless repeater of claim 10, wherein the processor device is configured to select at least one carrier for downlink transmission from the plurality of carriers by selecting a carrier based, at least in part, on a priority list of carriers to use.

19. The first wireless repeater of claim 10, wherein the processor device is configured to access information indicative of a plurality of most frequently used carriers for uplink transmission and to select at least one carrier for downlink transmission from the plurality of carriers by selecting one or more downlink carriers corresponding to one or more of the plurality of most frequently used carriers for uplink transmission.

20. The first wireless repeater of claim 16, wherein the wireless communication device comprises a modem.

21. A first wireless repeater having a first antenna and a second antenna to receive an input signal and transmit an output signal, the input signal associated with a plurality of carriers, the first repeater comprising:

means for receiving the input signal of an uplink or downlink transmission and generating a baseband input signal;

means for generating the output signal of the respective uplink or downlink transmission from a baseband output signal;

means for communicating with at least the first and second antennas for supporting wireless communication over a wireless network; and means for selecting at least one carrier for downlink transmission from the plurality of carriers, wherein the selected at least one carrier is different than a carrier for a second repeater proximate to the first repeater, wherein a hash function that excludes selection of the carrier for the second repeater is used, at least in part, to select the at least one carrier for the first repeater, and means for selecting at least one carrier for uplink transmission corresponding to the selected carrier for uplink transmission, wherein after at least one uplink and at least one downlink carriers are selected, the repeater is operative to amplify and transmit only the at least one selected uplink carrier for at least the uplink transmission.

22. A non-transitory machine-readable medium comprising instructions, which, when executed by a machine, cause the machine to perform operations, the instructions comprising:

receiving a baseband input signal associated with an input signal of an uplink or downlink transmission of a first wireless repeater and generating a baseband output signal associated with an output signal of the respective uplink or downlink transmission of the first wireless repeater, the input signal being associated with a plurality of carriers;

selecting at least one carrier for downlink transmission from the plurality of carriers, wherein the selected at least one carrier is different than a carrier for a second repeater proximate to the first repeater, wherein a hash function that excludes selection of the carrier for the second repeater is used, at least in part, to select the at least one carrier for the first repeater;

selecting at least one carrier for uplink transmission corresponding to the selected carrier for downlink transmission; and amplifying and transmitting only the selected carrier for at least the uplink transmission.

23. A non-transitory computer-readable medium including program code stored thereon, comprising:

program code to receive an input signal associated with an uplink or downlink transmission of a first wireless repeater and to generate an output signal associated with the respective uplink or downlink transmission of the first wireless repeater, the input signal associated with a plurality of carriers;

program code to select at least one carrier for downlink transmission from the plurality of carriers, wherein the selected at least one carrier is different than a carrier for a second repeater proximate to the first repeater, wherein a hash function that excludes selection of the carrier for the second repeater is used, at least in part, to select the at least one carrier for the first repeater;

program code to select at least one carrier for uplink transmission corresponding to the selected carrier for downlink transmission; and program code to amplify and to transmit only the selected carrier for at least the uplink transmission.

* * * * *